United States Patent [19]

Pickin et al.

[11] 4,011,170

[45] Mar. 8, 1977

[54] MARBLED DETERGENT BARS

[76] Inventors: John Harlan Pickin, 1 Woodside Road, Madison, Morris County, N.J. 07940; Russell Edward Compa, 24 McClellan Terrace, West Orange, Essex County, N.J. 07052; Hargovind H. Joshi, 1214 Brookside Road, Piscataway, Middlesex County, N.J. 08854

[22] Filed: July 10, 1974

[21] Appl. No.: 487,199

[52] U.S. Cl. ............................... 252/134; 252/367; 264/75; 264/102; 264/142; 264/148; 264/211

[51] Int. Cl.[2] ........................ B29F 3/12; B29B 1/04; C11D 17/00; C11D 13/18

[58] Field of Search ............ 264/75, 211, 102, 148, 264/349, 144, 141–143; 425/131; 252/367, 134, 368–371

[56] References Cited

UNITED STATES PATENTS

| | | | |
|---|---|---|---|
| 3,485,905 | 12/1969 | Compa et al. ....................... | 264/75 |
| 3,663,671 | 5/1972 | Meye et al. .......................... | 264/75 |
| 3,673,294 | 6/1972 | Matthaei ............................ | 264/75 |
| 3,676,538 | 7/1972 | Patterson ............................ | 264/75 |
| 3,769,225 | 10/1973 | Matthaei ............................ | 264/75 |
| 3,832,431 | 8/1974 | Matthaei ............................ | 264/75 |

*Primary Examiner*—Jeffery R. Thurlow

[57] ABSTRACT

Method and apparatus for producing marbled toilet bars including the addition of a liquid dye material to the vacuum chamber between the upper and lower barrels of a double-barrel soap plodder. The soap segments falling into the vacuum chamber are defined as having either a circular, rectangular or triangular configuration and a geometric ratio (surface area/volume) of from 2 to 12.

9 Claims, 6 Drawing Figures

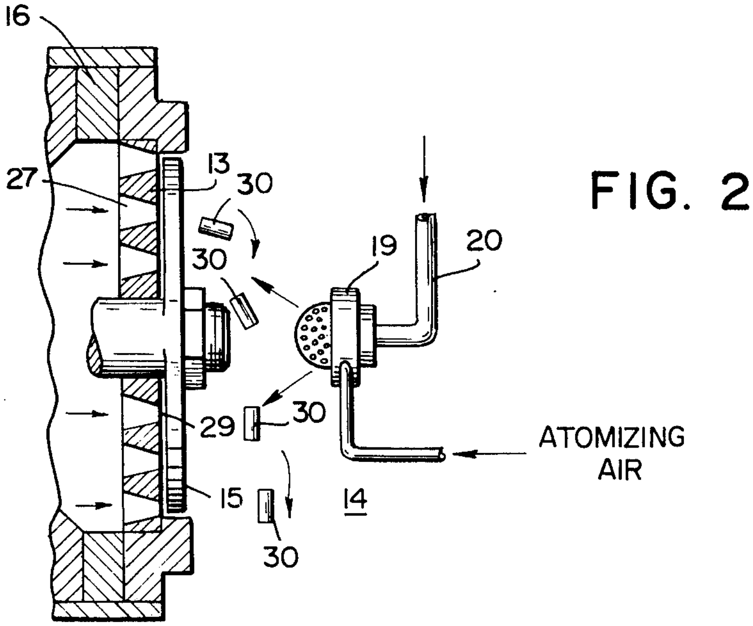
FIG. 2
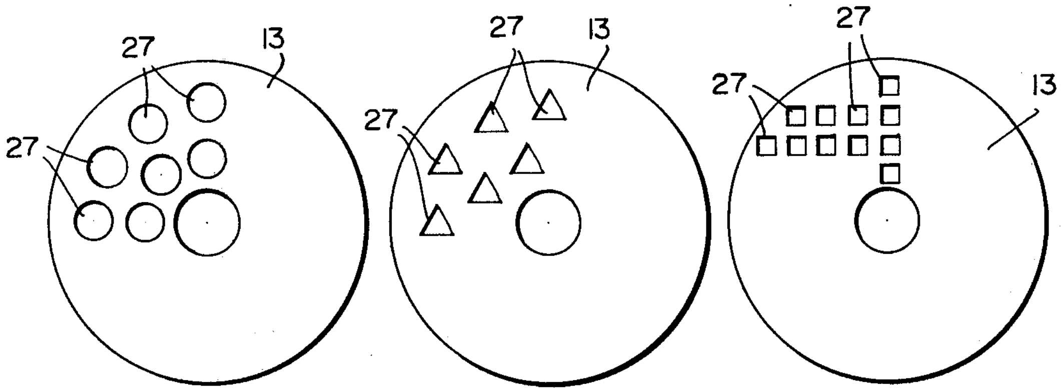
FIG. 3a FIG. 3b FIG. 3c
FIG. 4
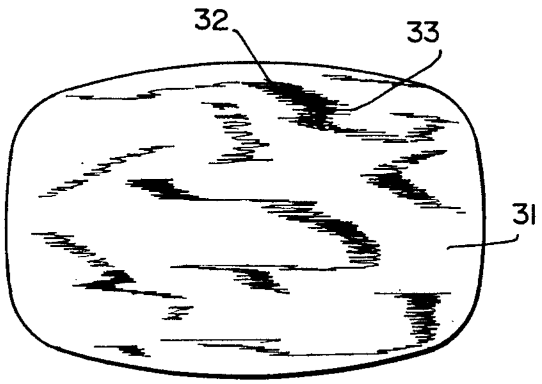

MARBLED DETERGENT BARS

BACKGROUND OF THE INVENTION

The present invention pertains to a method and apparatus for producing detergent bars having a marbled appearance. As used herein the term "detergent" is meant to include fatty acid soaps, synthetic detergents or combinations of these materials. "Detergent bars" are defined as milled and plodded toilet bars with or without emollients and/or bacteriostats made from "detergent" materials.

The prior art is replete with what is commonly known as variegated or striated bar made either as a framed soap or a milled and plodded bar. Mild and plodded toilet bars having a variegated or striated appearance are known from U.S. Pat. Nos. 3,485,905 and 3,673,294 among others. The toilet bars of the invention are clearly distinguishable over the variegated or striated bars of the prior art by having a pattern of colored detergent against a contrasting base that can be accurately described as "marbleized" since it includes wavy veining and mottling with spots and blotches as opposed to the typical striations or longitudinal streaks of the prior art. The new bars are further characterized by clear and distinct lines of demarcation between the base and contrasting components; and a minimum of bleeding or smearing of the colored component into the base.

In producing multicolored bars from milled and plodded detergents a significant problem encountered is smearing of the colored substance into the base component during mixing by the plodder worm and extrusion through the apertures of a pressure plate. The base component of the bar is typically a white soap which is discolored by the smearing and as a result presents less of a contrasting background for the colored component. For example, if it were desired to produce a multicolored bar having a white background with deep green striations or mottling, excessive mixing of the colored material, either in the form of a liquid dye or pigment dispersion, with the white base component by the plodder screw could result in an extruded billet having a light green background with medium green striations or mottled areas.

A primary advantage of the invention is to provide a method and apparatus for producing multicolored toilet bars from milled and plodded detergents wherein the colored pattern is distinct, has a marbled appearance as defined above and maintains its physical integrity during use.

A further advantage of the invention is to minimize the smearing of the colored component into the base component during mixing of the combined base detergent and colored component.

SUMMARY OF THE INVENTION

The foregoing advantages and other advantages of the invention are attained by producing multicolored bars by utilizing a double-barrel vacuum plodder apparatus. The base detergent component is plodded through the upper barrel of the plodder apparatus, discharging the worked base detergent into the vacuum chamber between the upper and lower plodder screws in the form of elongated segments to be hereinafter more specifically defined; adding a coloring agent in the form of a liquid coloring agent to the vacuum chamber in a specifically defined amount in relation to the amount of detergent being processed; ploddng the detergent segments and coloring agent through the bottom barrel of the plodder, and extruding a marbleized billet through an extrusion die downstream of the bottom plodder barrel. After extrusion, the billet can be cut to size and pressed to the desired shape.

According to one aspect of the invention, the combined base detergent component and coloring agent are plodded together and subjected to compression and extrusion through only the bottom or downstream barrel of the double-barrel plodder to reduce the potential amount of color smearing, and are not extruded together through the pressure plate of the upper plodder barrel. The coloring agent is added to the base detergent component in the vacuum chamber between barrels and only the base component is extruded through the pressure plate at the terminus of the first plodder screw and immediately upstream of the vacuum chamber thereby avoiding potential smearing through the apertures of the plate.

In accordance with a further aspect of the invention the segments of base detergent supplied to the vacuum chamber are characterized by having a cross section of either a circular, triangular, rectangular or other geometric configuration, a cross sectional dimension from ¼ to 2 inches and a length dimension from 1 to 4 inches. Various and different marbleized patterns can be obtained by utilizing segments of different configurations. In further accordance with this aspect of the invention the segments of base detergent extruded through the upper barrel pressure plate should be within a size range that is best defined by the ratio of the surface area of the segments to their volume hereinafter referred to as the geometric ratio. Multicolored bars made from detergent segments having a geometric ratio of from about 2 to 12, preferably between 2 and 8, and most preferably from about 3 to about 6, according to the techniques of the invention have been found to have a strikingly sharp definition between colors and a very attractive marbleized pattern with a minimum of smearing. The use of segments having a geometric ratio in the defined range surprisingly results in substantially less smearing of the coloring agent into the base detergent during mixing when compared to spaghetti-like filaments of detergent typically used.

The present invention provides for non-uniform distribution of color to provide a marbleized detergent toilet bar having at least two colors in which white is considered a color. In general, a conventional white toilet soap comprising fatty acid soap, white pigment, preservative and perfume is mixed and milled on conventional equipment and fed into the top worm of a double-barrel vacuum plodder such as described and illustrated in U.S. Pat. No. 2,649,417. The soap travels through the top barrel and is extruded therefrom as segments having the characteristics disclosed above into an evacuated chamber enclosing the discharge end of the top worm and the feed end of the bottom worm. Through the housing and into the vacuum chamber is introduced a spray nozzle for spraying atomized coloring agent onto the segments of detergent falling into the vacuum chamber from the upper barrel pressure plate.

A conduit is provided to supply coloring agent from a supply vessel located outside of and preferably above the vacuum chamber. A source of pressurized air is also provided for the spray nozzle in order to atomize the liquid coloring agent before it is discharged by the spray nozzle. The supply vessel contains a liquid coloring agent of a concentration to provide the desired color contrast with the basic color of the feed soap. As the detergent segments fall from the top worm to the bottom worm, the spray nozzle is adjusted to cause the liquid coloring agent to be sprayed onto the segments at a rate sufficient to produce the desired marbled effect in the extruded detergent bar. A drip tube, such as that disclosed in U.S. Pat. No. 3,485,905, can also be used for adding the coloring agent to the vacuum chamber, although the aforementioned spray nozzle is preferred.

The coloring component of the new bars is preferably a liquid dye solution or pigment dispersion wherein the active coloring ingredient is present in a concentration of from 5 to 10 percent by weight, although the coloring agent concentration is not critical.

According to a further aspect of the invention the amount of coloring agent, either dry dye or pigment per weight unit of detergent has been found to be an important aspect of the invention. When detergent segments having dimensions according to the invention and a geometric ratio from about 2 to about 12 are utilized it has been observed that from about 0.007 to about 0.10 pounds of dry dye or pigment (before dispersion in the aqueous carrier) per 100 pounds of detergent material preferably about 0.05, produces bars with an optimized marbled pattern. The amount of coloring agent used should be on the high side of this range when weak colors such as yellow are used and when the geometric ratio is on the low side of the specified range.

BRIEF DESCRIPTION OF THE DRAWING

The invention will now be described with reference to the accompanying drawing in which:

FIG. 2 is a cross sectional partial plan view of a pressure plate assembly and spray nozzle according to the invention.

FIG. 3 is a series of elevational views of various pressure plates according to the invention and, FIG. 4 is a representative illustration of a marbled toilet bar produced by the method of the invention.

DESCRIPTION OF PREFERRED EMBODIMENTS

Figure 1:
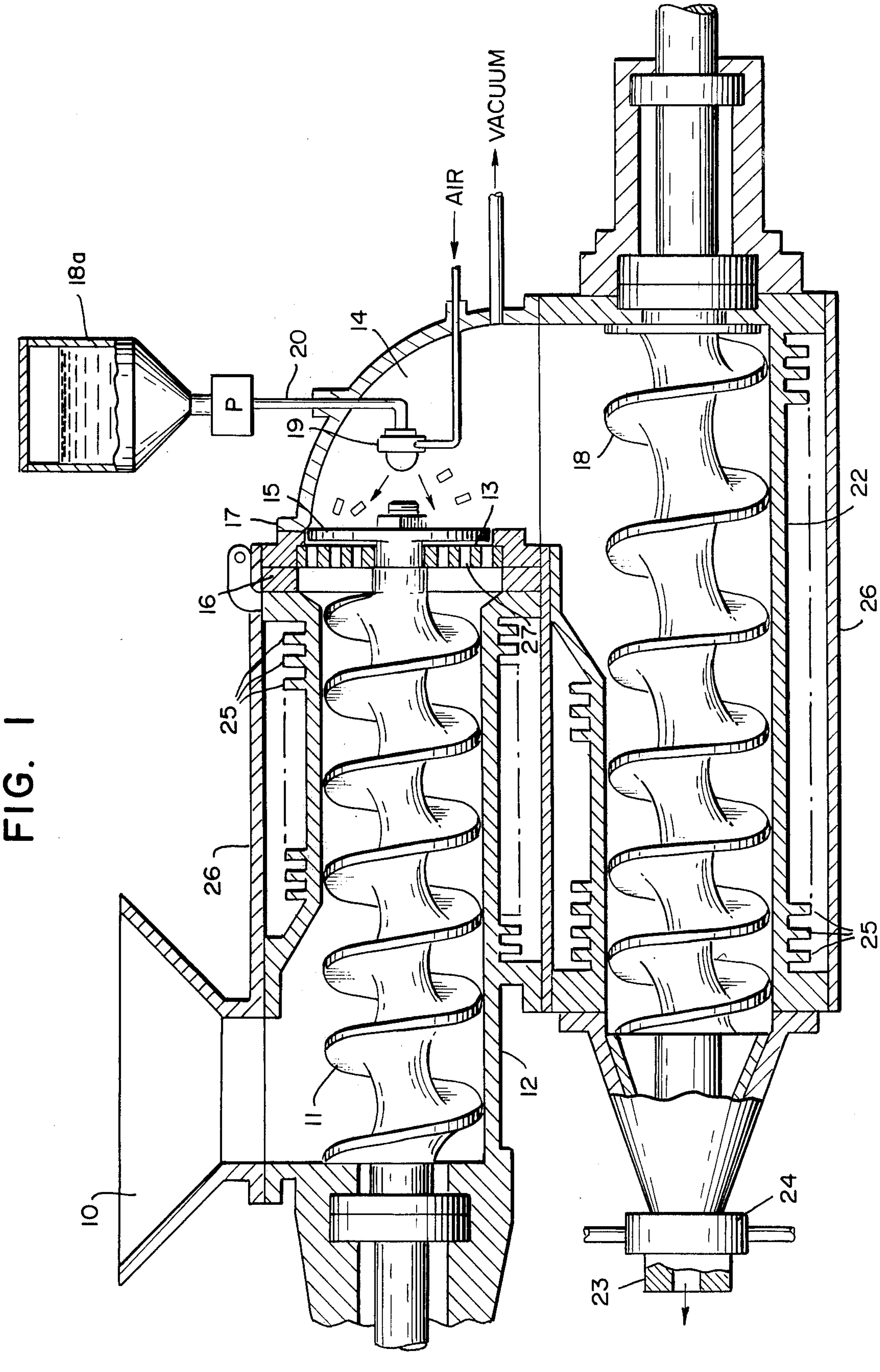
FIG. 1 is a schematic plan view of the apparatus of the invention.

Referring to FIG. 1 of the drawing, milled soap is fed into an opening 10 in any suitable manner and onto a top worm 11 of a double-barrel vacuum plodder which rotates within an upper cylinder 12. The top worm carries the soap forward, that is from left to right in the drawing, and at the same time compacts or compresses it and subjects it to a certain amount of mixing. The plodded soap is forced through the holes of a backing or pressure plate 13 into an evacuated chamber 14. Behind the pressure plate 13 is set a knife 15, having from 1 to 4 blades, which is directly fastened to the worm 11 and rotates with it, thus serving to cut the rods of soap that are extruded through pressure plate 13 by the upper worm 11 into proper lengths for feeding to the remainder of the apparatus. The pressure plate 13 is supported by flanges 16 and 17 permitting the plate to be readily exposed or removed for cleaning.

The segments of soap, after being cut into proper lengths as described above, fall by gravity through chamber 14 onto a lower worm 18 (while still under vacuum). Immediately after being cut or while falling through the chamber 14, the segments of soap are contacted by a solution or dispersion of a liquid coloring agent supplied from a container 18*a* to a spray nozzle 19 which communicates with the container 18*a* through conduit 20. A metering pump P is provided in conduit 20 for supplying the desired amount of coloring agent to the spray nozzle 19. An air supply that communicates with the spray nozzle 19 to supply air under a pressure of from about 2 to 10 psi for atomizing the liquid coloring agent as it is discharged is also provided.

The lower worm 18 rotates in a lower cylinder 22 and compacts and forces the soap forward through a nozzle 23. This nozzle is constructed in the usual fashion and is provided with a nozzle jacket 24.

Preferably, the nozzle 23 is one having cutting edges which shave-off the outer 1/32 to ⅛ of an inch of the surface as the bar is extruded through the nozzle. For example, the structure described in Austrian Pat. No. 95,947 (Sept. 15, 1923) gives satisfactory results.

Both the upper cylinder 12 and the lower cylinder 22 are provided with the fins 25 and jackets 26 so that coolant can be circulated around the cylinders 12 and 22 to maintain the temperature of the soap being forced through the cylinders by the worms sufficiently low to ensure the production of a bar of soap of proper consistency and plasticity in accordance with ordinary practice.

Referring to FIG. 2, a pressure plate according to one aspect of the invention is shown. The plate 13 is typically from ½ to 2½ inches thick and includes a large plurality of apertures 27 extending through the plate. Soap is forced by worm 11 through the apertures 27 to form continuous rods of soap having the dimensions of the downstream side 29 of apertures 27. Rotating knife blades 15 are rotated at a sufficient speed to cut the rods into discrete segments 30. Segments 30 have a length dimension from about 1.0 to 4 inches preferably from about 1 to about 3. According to this aspect of the invention apertures 27 can be inwardly tapering in a downstream direction as shown in FIG. 2 in order to compress the soap into a cohesive rod that retains its physical integrity when cut into segments 30. The apertures 27 can taper slightly to a downstream dimension on side 29 of plate 13 of about ¼ to 2 inches preferably about ½ to about 1¼ inch. In this sense the term "dimension" is meant to define the diameter of circular openings or the longest dimension of triangular and rectangular apertures.

As shown in FIG. 3 the apertures 27 of plate 13 can have various configurations such as the circular, triangular, and rectangular shapes shown. Of course the segments 30 resulting from each of these plates will have the same general cross sectional shape as the respective apertures 27. The apertures 27 can be tapered as shown in FIG. 2 or can be untapered as shown in FIG. 1.

As shown in FIGS. 3*a*, *b* and *c* the apertures 27 of pressure plate 13 can take a circular, triangular or square form.

In any case, it is an important element of the invention that the geometric ratio as hereinbefore defined be from about 2 to about 12, preferably from about 2 to about 8.

Illustrative of the production of bars of soap having marbled appearance according to the invention are the following examples.

EXAMPLE 1

Blue on White

Chips of soap comprising 17 percent coconut fatty acid soap and 83 percent hydrogenated tallow acids sodium soap are mixed with titanium dioxide, preservative and perfume in the proportions given hereinafter

| Ingredient: | Weight Percent |
|---|---|
| 17:83 coco:tallow sodium soap chips | 95.85 |
| White Pigment (Opacifier) | 0.50 |
| Preservative | 0.15 |
| Perfume | 1.50 |
| Bacteriostat | 1.00 |
| Miscellaneous Additives | 1.00 |

The soap chips, white pigment, preservative, perfume, bacteriostat and additives are mixed and milled. The milled chips are fed into the top worm of a 4 inch double-barrel vacuum plodder. After the segments pass through pressure plate 13 a 10 percent aqueous dispersion of a blue pigment such as Monastral Green GWD available from E. I. duPont de Nemours is sprayed onto the segments at a predetermined rate of about ½ pound of pigment dispersion per 100 pounds of soap to produce the marbled effect.

The pressure plate 13 used in this example has circular apertures 27 having a diameter of 1¼ inch. Knife 15 has four blades and is rotated at a sufficient speed to produce segments 2 inches long. The geometric ratio in the foregoing example is 5 and the final bar has a distinct marbled appearance such as that shown in FIG. 4 with an undiluted white background 31, vibrant blue colored areas 32 and a distinct line of definition 33 between the two areas.

EXAMPLE 2

Example 1 is repeated using a pressure plate 13 having ¼ inch circular apertures 27. Knife 15 is rotated to produce segments 30 having a length of 3 inches. The geometric ratio is 4.66. The resulting bar is similar in appearance to that shown in FIG. 4.

EXAMPLE 3

Example 1 is repeated using a pressure plate 13 having 1 inch square apertures 27. Knife 15 is rotated to produce segments 30 having a length of 2 inches. The geometric ratio is 5. The resulting bar is similar in appearance to that shown in FIG. 4.

EXAMPLE 4

Example 1 is repeated using a pressure plate 13 having apertures 27 in the form of an isosceles triangle having a side of 1¼ inch. Knife 15 is rotated to form segments 2 inches long. The geometric ratio is about 6.06. The resulting bar is similar in appearance to that shown in FIG. 4.

EXAMPLE 5

Example 1 is repeated using a pressure plate 13 having apertures 27 in the form of a rectangle having a ½ inch by 1 inch cross section. Knife 15 is rotated to produce segments having a length of 2 inches. The geometric ratio is 7. The resulting bar is similar in appearance to that shown in FIG. 4.

EXAMPLE 6

Example 1 is repeated using a pressure plate 13 having apertures 27 in the form of isosceles triangles having a side of 2 inches. The extrudants are cut to a length of 2 inches. The geometric ratio is about 4. The amount of aqueous coloring agent added is 0.8 pounds per 100 pounds of detergent material. The resulting bars are similar in appearance to that shown in FIG. 4.

EXAMPLE 7

Example 1 is repeated with knife 15 rotated at a rate to produce segments having a length of 1 inch. The amount of aqueous coloring agent added is 0.1 pounds per 100 pounds of detergent material. The geometric ratio is 5.2 and the resulting bar is similar in appearance to that shown in FIG. 4.

EXAMPLE 8

Example 1 is repeated with knife 15 rotated at a rate to produce segments having a length of 4 inches. The geometric ratio is 3.7 and the resulting bar is similar in appearance to that shown in FIG. 4.

The blanks cut from the extruded bars of the Examples 1–8 can be pressed on a conventional rotary press or on a modified pin die press. When the latter press is used the bars can be pressed on end, which gives an interesting and unusual design seemingly emanating from the center of the bar.

The Examples 1–8 can alternately be performed to produce similar results using synthetic detergent chips such as sodium coco monoglycerylsulfate, in place of the soap chips. Aqueous solutions of soluble dyes, such as "Heliogen Blue" can be used in place of the pigment dispersions in Examples 1–8.

We claim:

1. A method for producing marbled detergent bars comprising the steps of supplying a base detergent material to the inlet of the upper barrel of a double-barrel plodder apparatus having a vacuum chamber between the upper and lower barrels, subjecting the base detergent material to plodding in said upper barrel, extruding said base detergent material through a pressure plate disposed on the downstream side of said upper barrel and into said vacuum chamber in the form of strands, cutting said strands into segments, said segments having a geometric ratio from about 2 to about 12, supplying a liquid coloring agent to said vacuum chamber, spraying said liquid coloring agent in atomized form onto said segments falling into the vacuum chamber from the upper barrel pressure plate, plodding said base detergent material and said liquid coloring agent in the bottom barrel of said plodder apparatus to form a marbled detergent mass, extruding said marbled detergent mass as a billet, cutting said billet into bars and pressing said bars into a predetermined shape.

2. The method according to claim 1 wherein said segments are from about 1.0 to about 4 inches in length.

3. The method according to claim 1 wherein said segments are from about 1 to about 3 inches in length.

4. The method according to claim 1 wherein said segments are from about ¼ to about 2 inches across the largest dimension of their cross section.

5. The method according to claim 1 wherein said geometric ratio is from about 2 to about 8.

6. The method according to claim 1 wherein said segments have a rectangular, circular or triangular cross sectional configuration.

7. The method according to claim 1 wherein said base detergent material is milled fatty acid soap.

8. The method according to claim 1 wherein said liquid coloring agent is a said dye solution or pigment dispersion and is supplied to said vacuum chamber in amounts from 0.007 to 0.10 pounds of dry dye or pigment per 100 pounds of base detergent component.

9. A marbled detergent bar produced by the method of claim 1.

* * * * *

UNITED STATES PATENT OFFICE

CERTIFICATE OF CORRECTION

Patent No. 4,011,170 Dated March 8, 1977

Inventor(s) John Harlan Pickin

It is certified that error appears in the above-identified patent and that said Letters Patent are hereby corrected as shown below:

On the cover sheet insert:

--[73] Assignee: Colgate-Palmolive Company, New York, N. Y. --.

Signed and Sealed this

*twelfth* Day of *July 1977*

[SEAL]

*Attest:*

RUTH C. MASON
*Attesting Officer*

C. MARSHALL DANN
*Commissioner of Patents and Trademarks*